(12) United States Patent
Horinouchi et al.

(10) Patent No.: US 7,235,738 B2
(45) Date of Patent: Jun. 26, 2007

(54) PORTABLE DATA DEVICE

(75) Inventors: Kazuyuki Horinouchi, Iga (JP); Masashi Shiomi, Iga (JP); Masayuki Ehiro, Izumi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/336,823

(22) Filed: Jan. 23, 2006

(65) Prior Publication Data

US 2006/0237209 A1  Oct. 26, 2006

(30) Foreign Application Priority Data

Jan. 24, 2005 (JP) .............................. 2005-016024

(51) Int. Cl.
*H02G 3/08* (2006.01)
(52) U.S. Cl. ..................... 174/50; 174/52.1; 174/54; 174/57; 361/680
(58) Field of Classification Search ............... 174/50, 174/521, 52.1, 54, 57; 361/680, 724
See application file for complete search history.

(56) References Cited

U.S. PATENT DOCUMENTS 6,836,404 B2 * 12/2004 Duarte ........................ 361/680

FOREIGN PATENT DOCUMENTS

| JP | 2002-135380 | 5/2002 |
| JP | 2002-244764 | 8/2002 |

* cited by examiner

*Primary Examiner*—Dhiru R. Patel
(74) *Attorney, Agent, or Firm*—Nixon & Vanderhye, PC

(57) ABSTRACT

A portable data device includes: a first body including a display section, the first body having a first long side and a first short side; a second body housing a circuit section for controlling the display section, the second body having a second long side and a second short side; and a connecting member for connecting the first and second bodies. The portable data device has a first position in which the first and second bodies substantially overlie each other and a second position in which the first body is rotated from the first position to overlie the second body such that a part of the second body extends beyond the first body and the second short side coincides with or is located apart from the first long or short side.

28 Claims, 11 Drawing Sheets

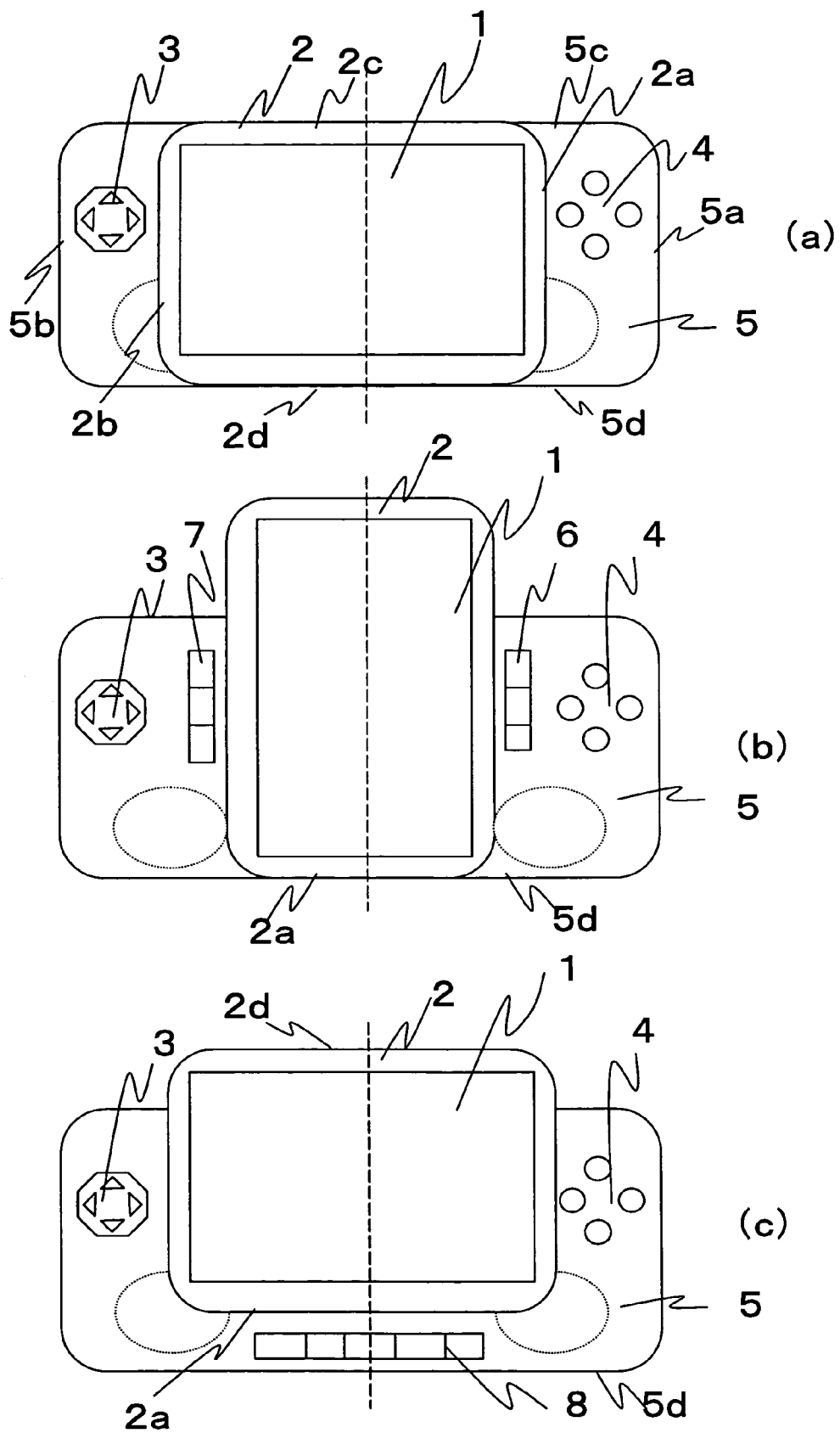
[FIG. 1]

[FIG. 2]
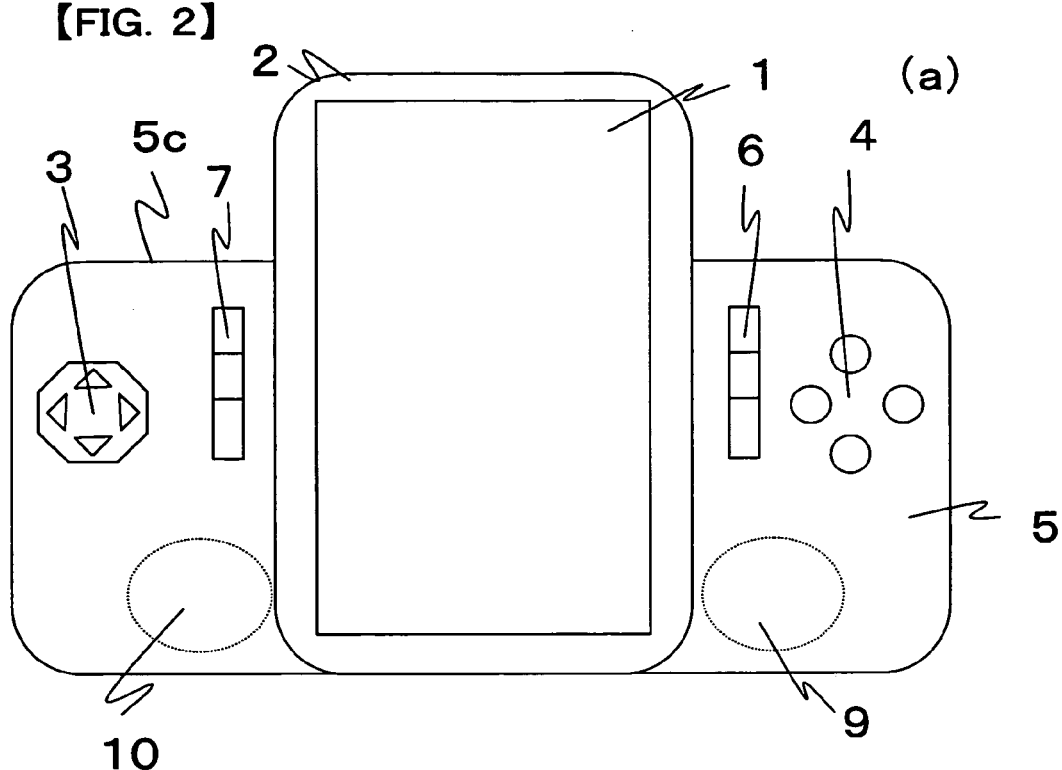
(a)
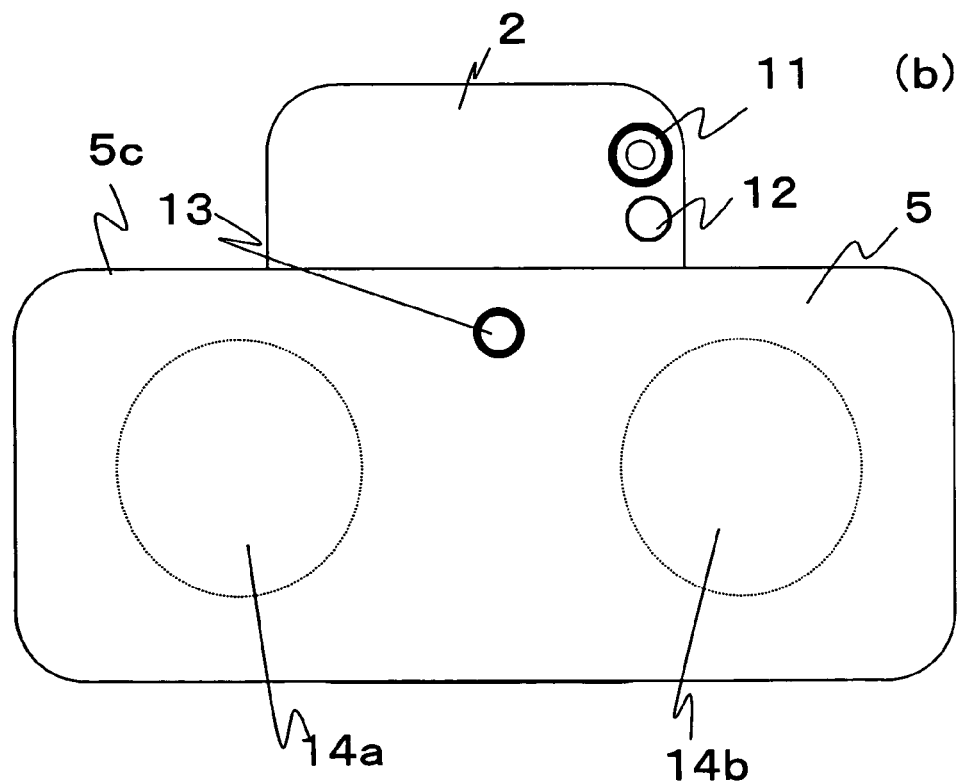
(b)

【FIG. 3】 (a)
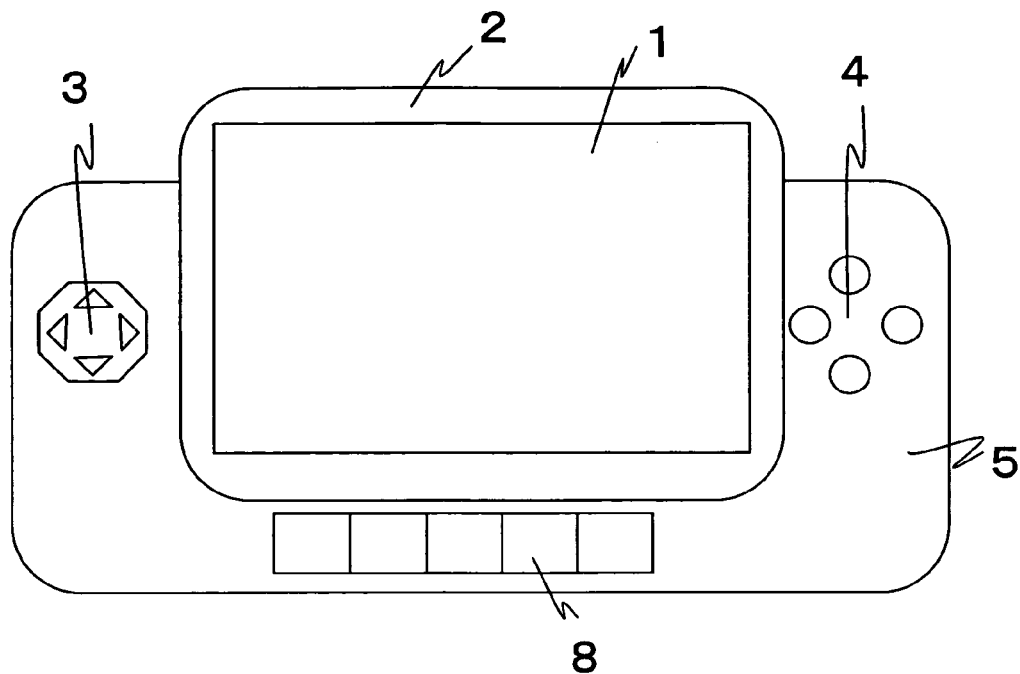
(b)
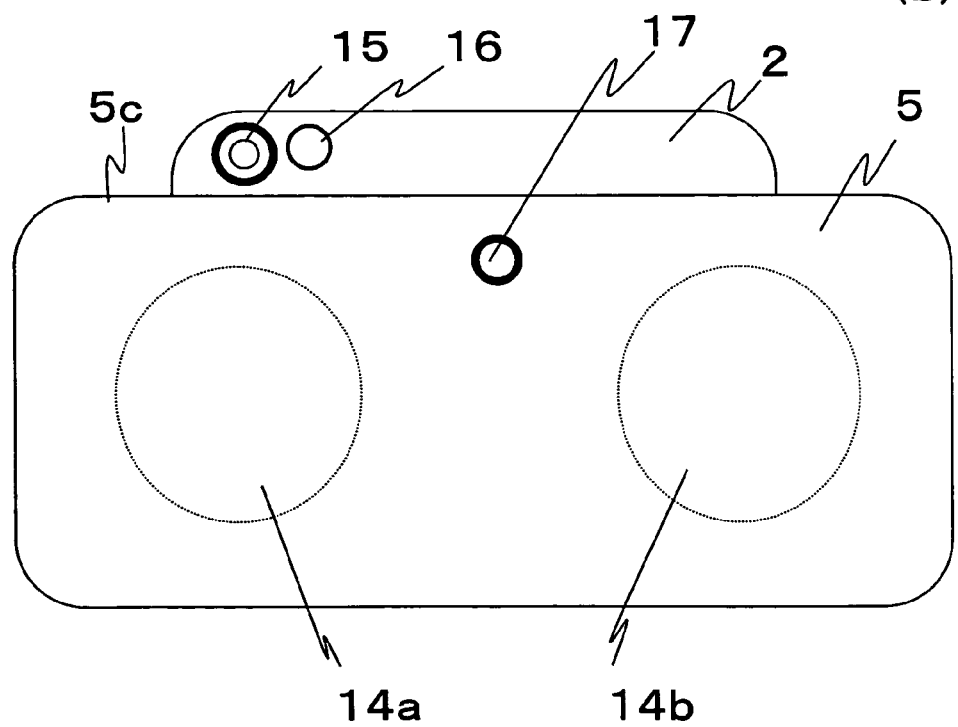

[FIG. 4]
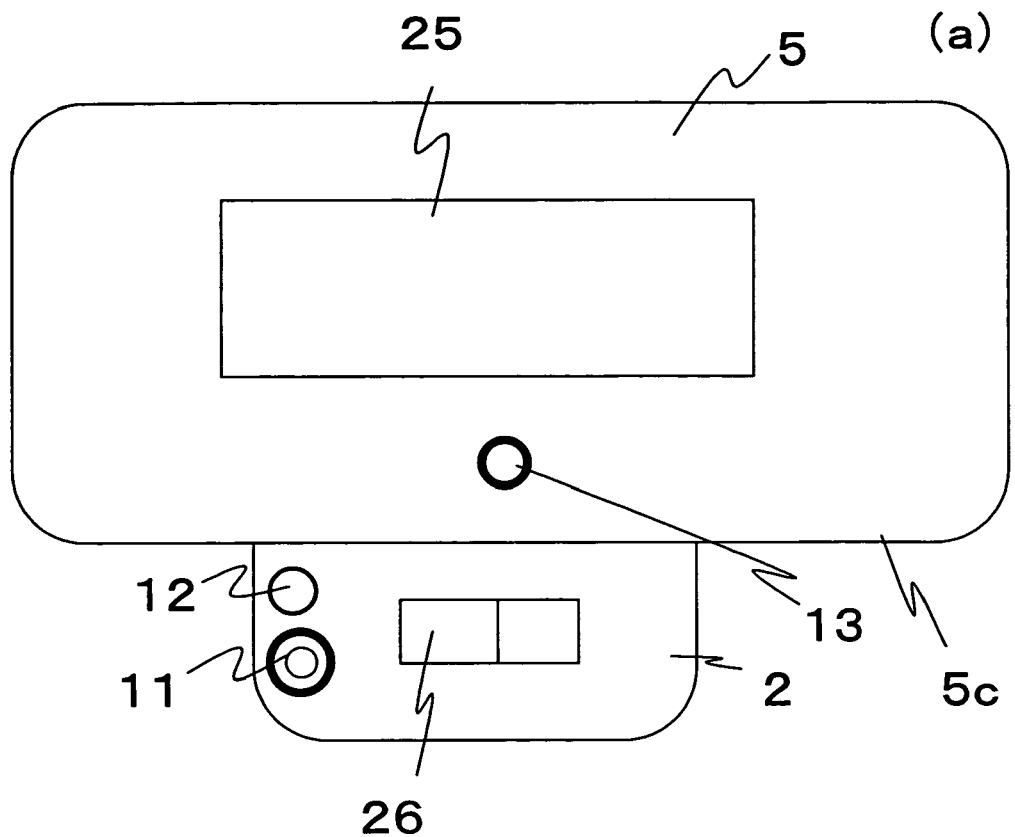
(a)
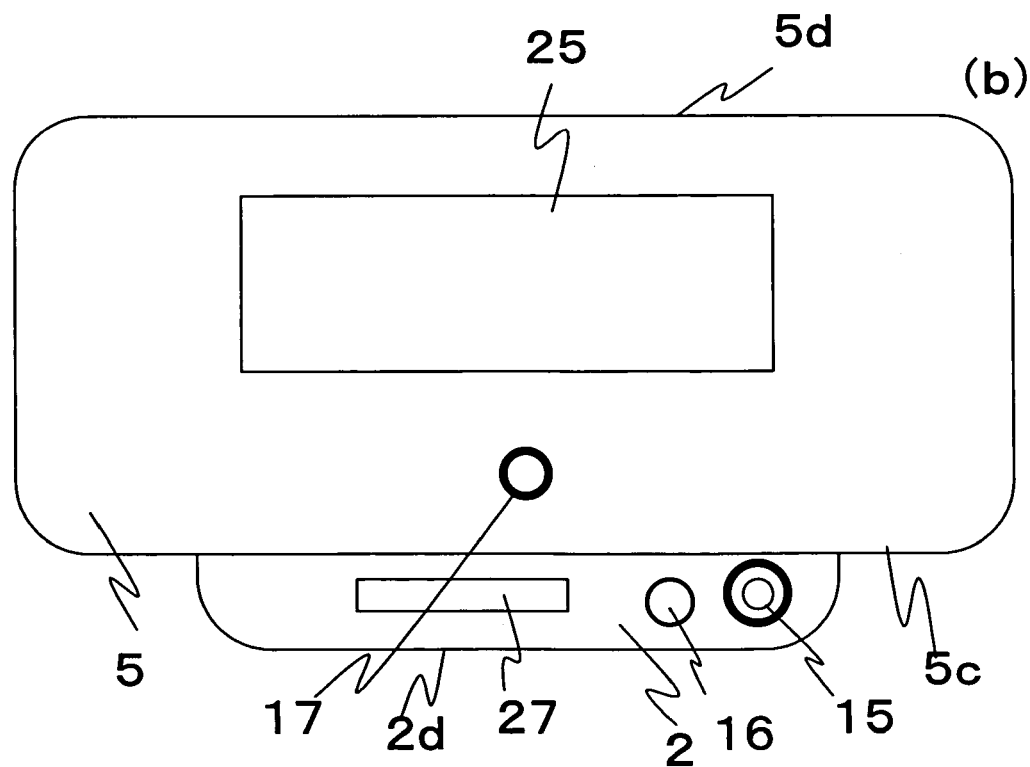
(b)

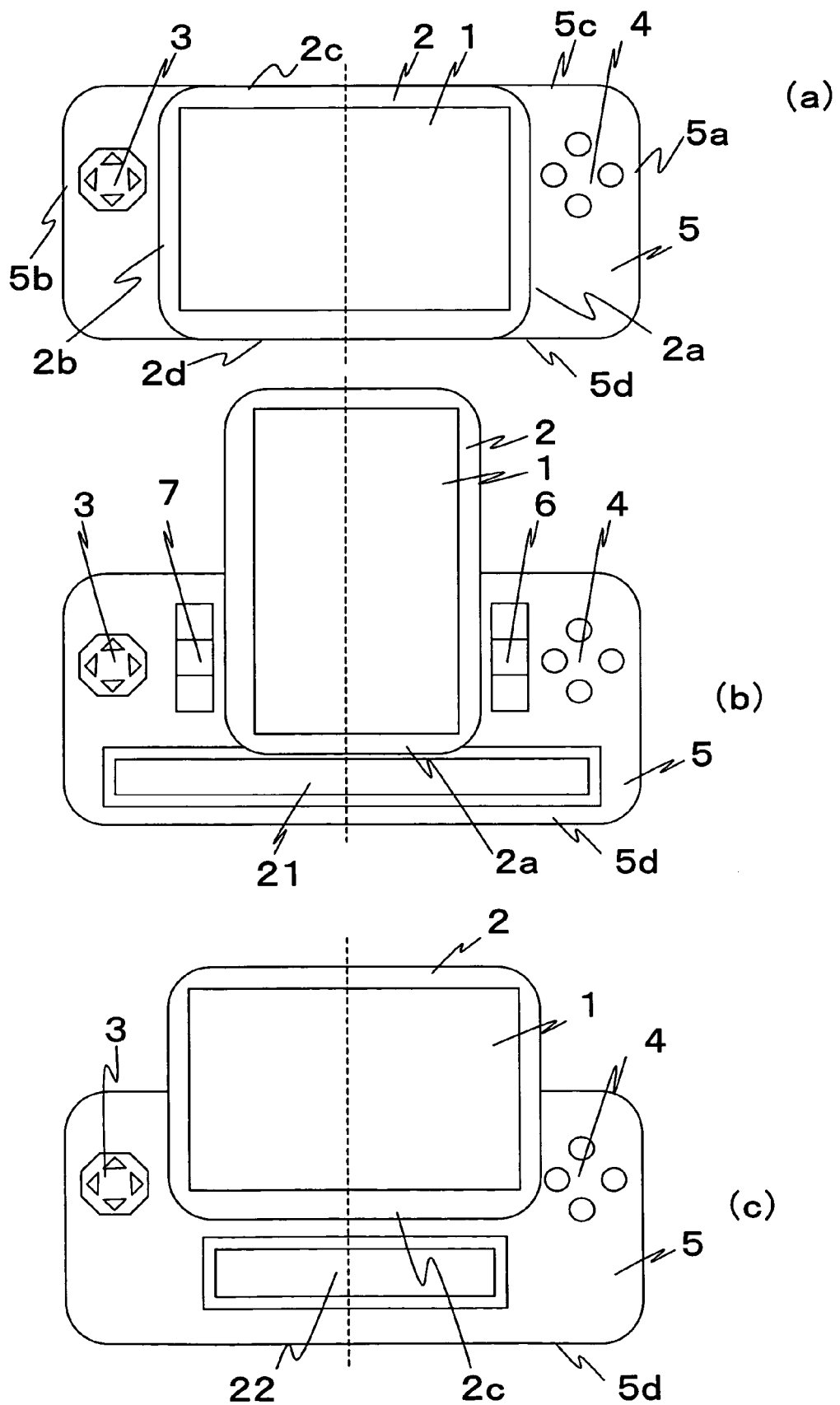

[FIG. 6]
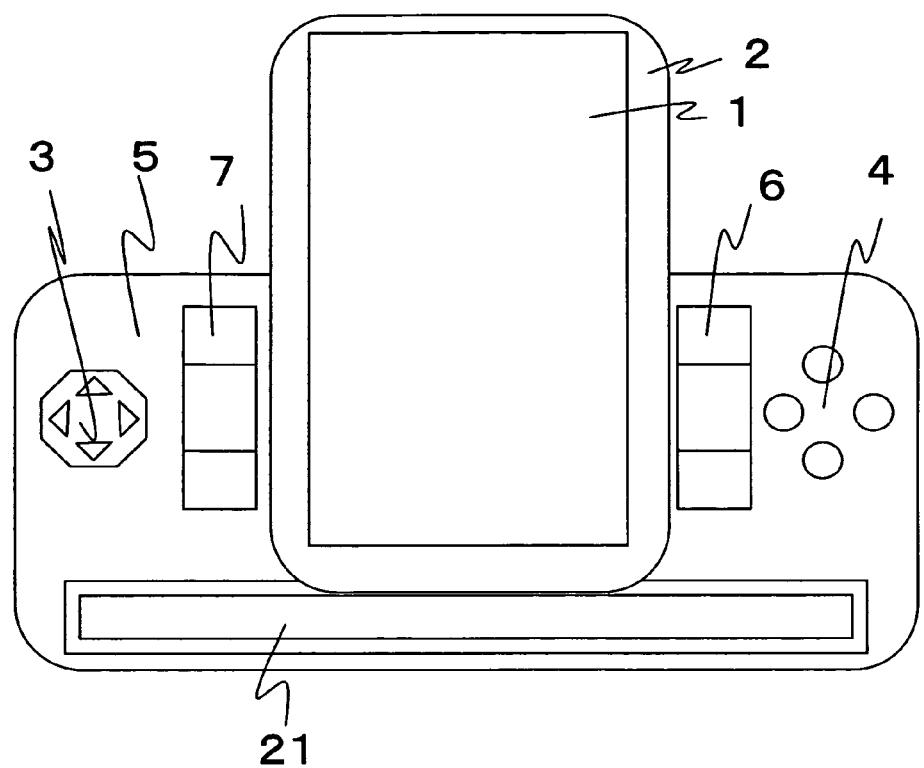
(a)
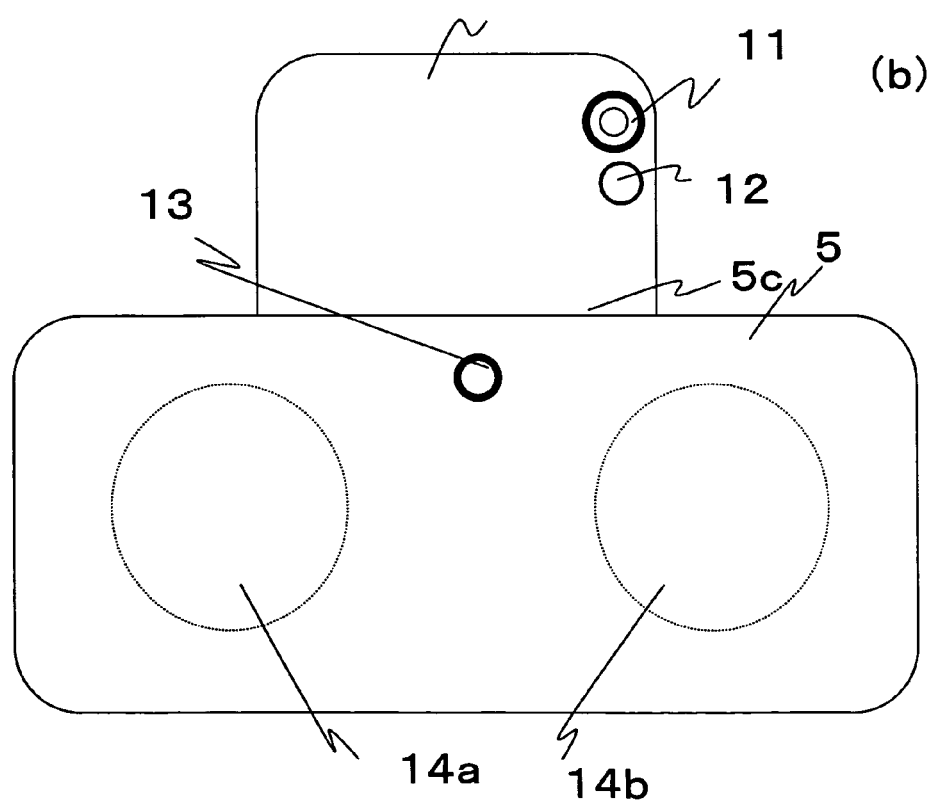
(b)

[FIG. 7]
(a)
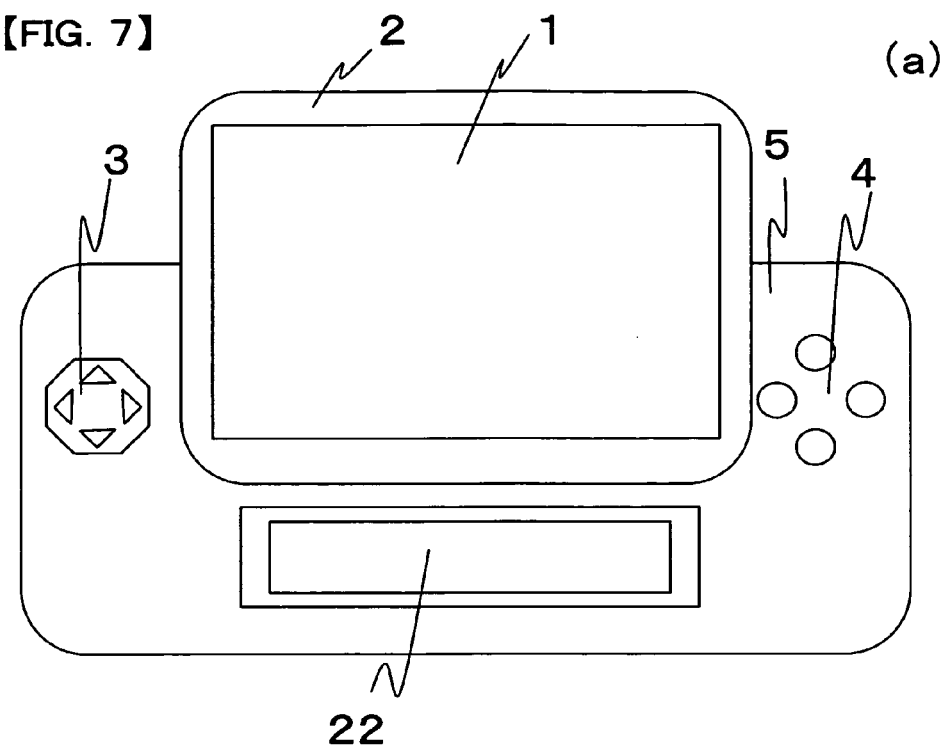
(b)
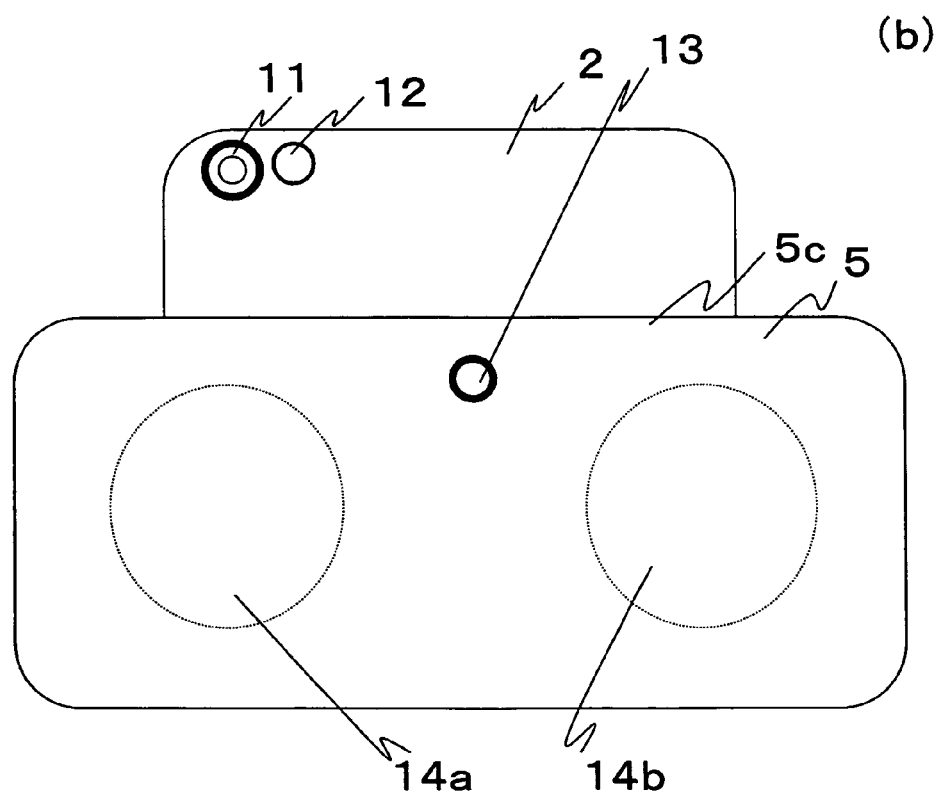

【FIG. 8】
(a)
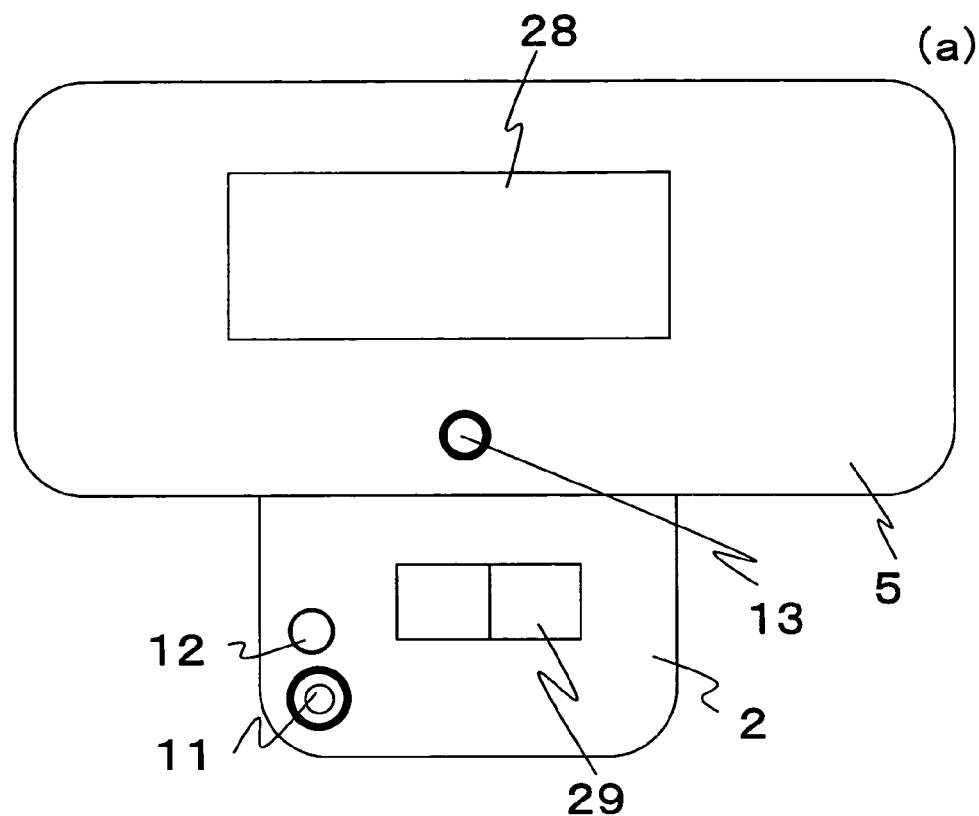
(b)
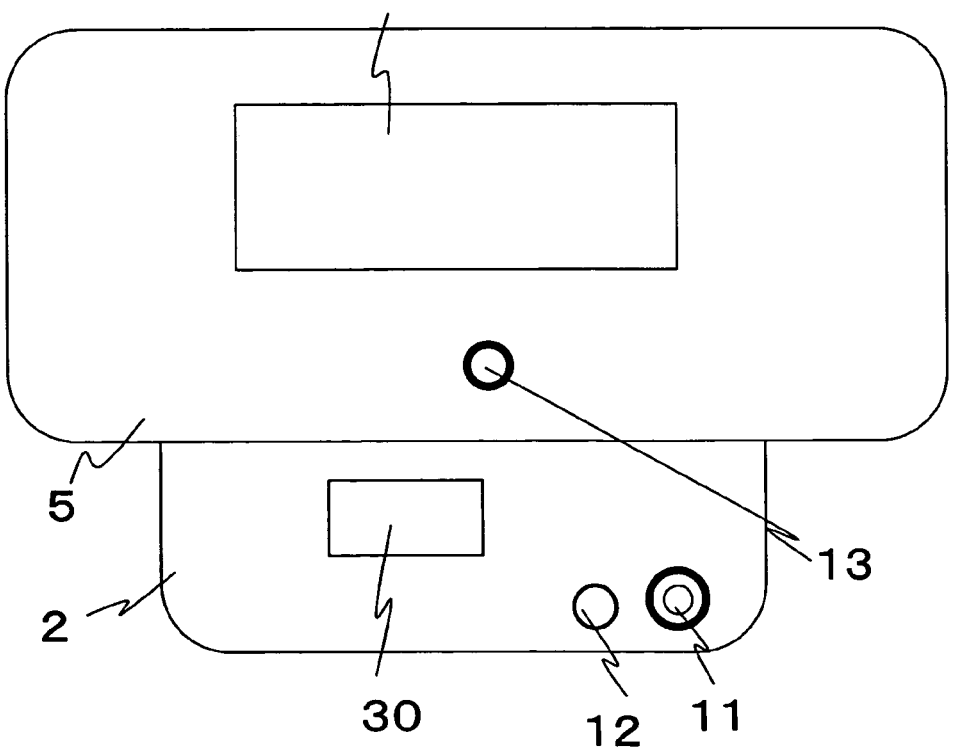

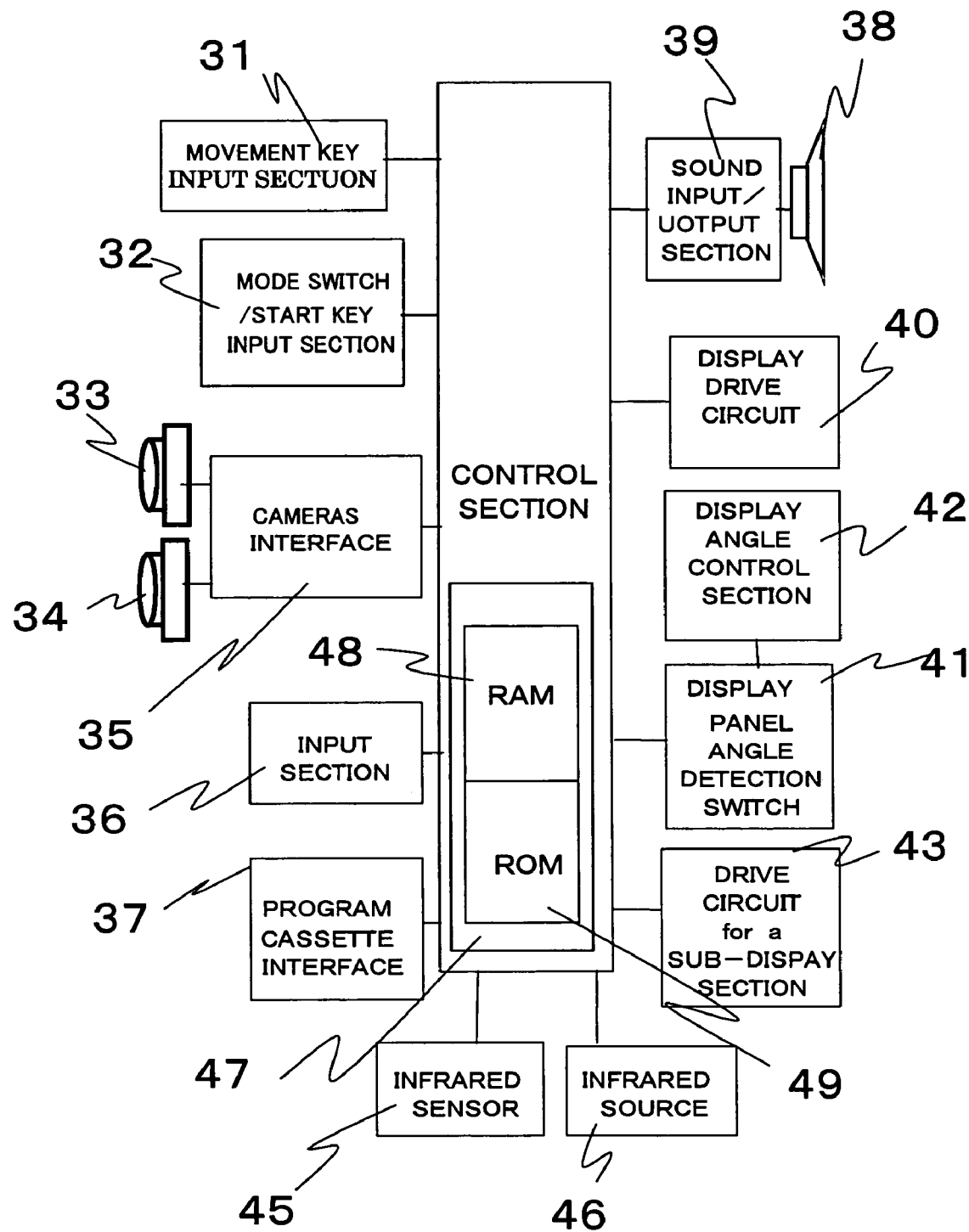

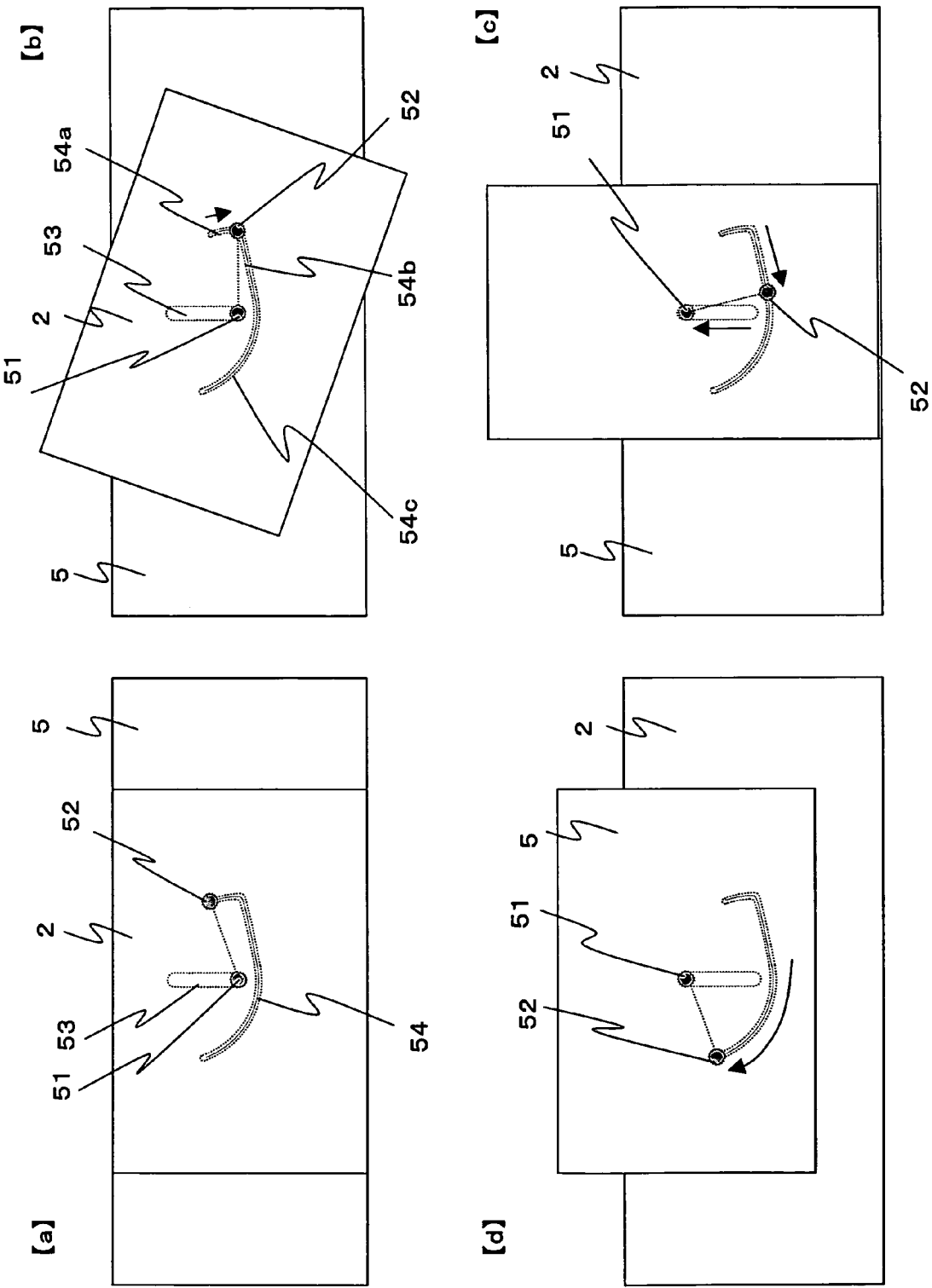

[FIG. 11]
(a)
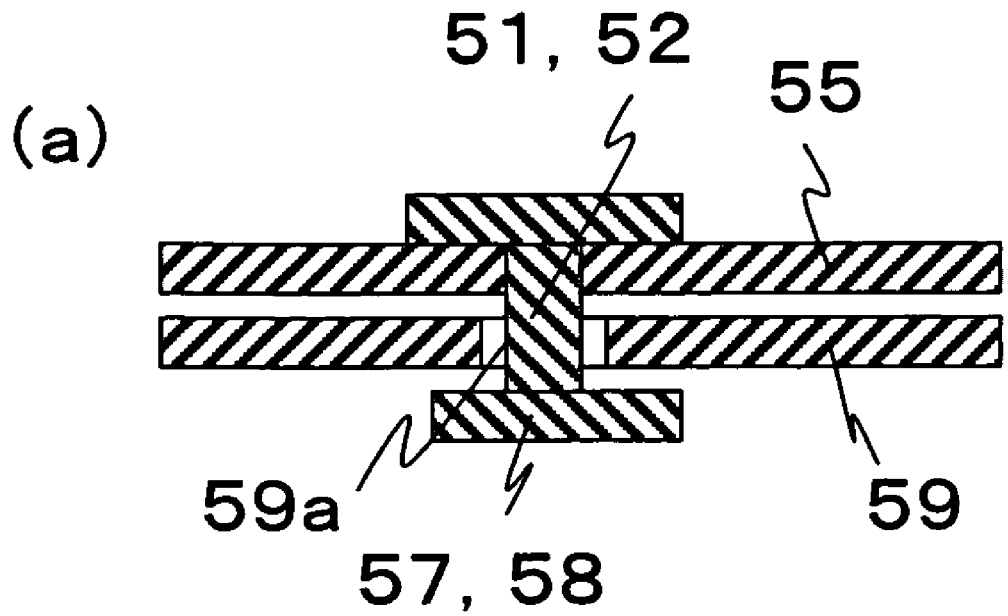
(b)
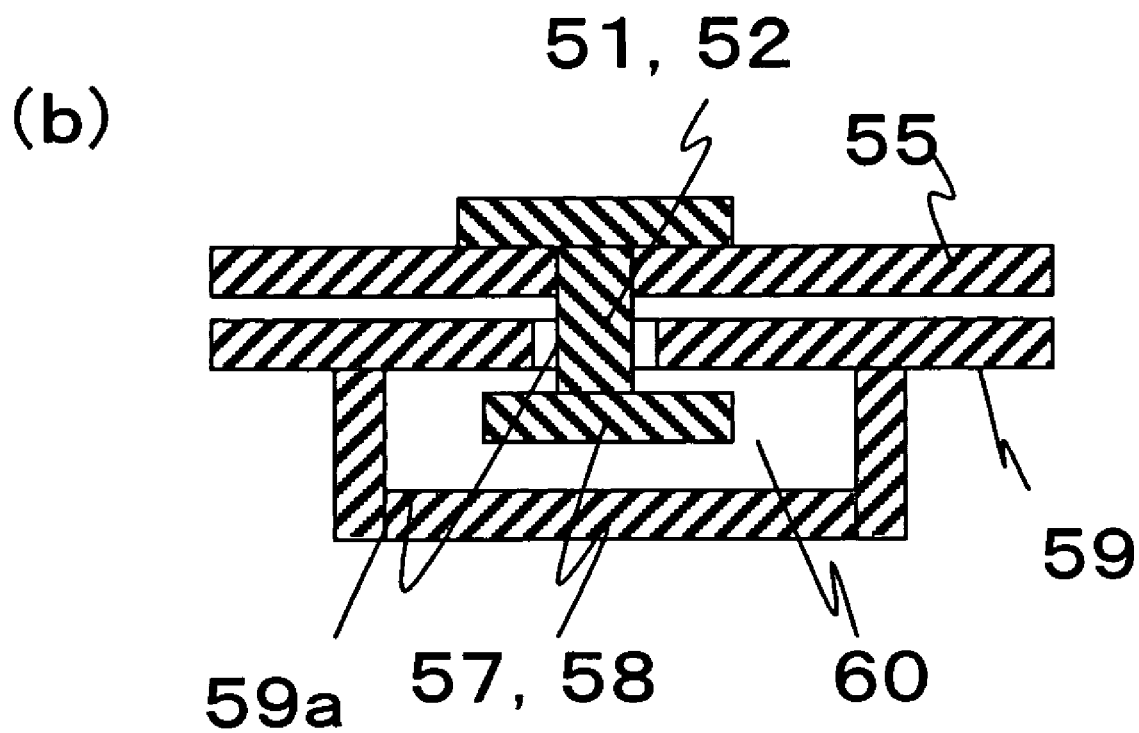

PORTABLE DATA DEVICE

CROSS-REFERENCE TO RELATED APPLICATION

This application is related to Japanese Patent Application No. 2005-16024 filed on Jan. 24, 2005, whose priority is claimed and the disclosure of which is incorporated by reference in its entirety.

BACKGROUND OF THE INVENTION

1. Field of the Invention

The present invention relates to a portable data device of a size that can be put in a bag or a pocket, or of a size that can be carried around. More particularly, the present invention relates to a portable data device that can be used in various forms.

2. Description of Related Art

Further miniaturization, increase in resolution and reduction in power consumption of liquid crystal display devices have been promoted. Miniaturization, higher integration, and lower power consumption of ICs and LSIs that constitute control circuits and drive circuits have also been promoted. Further, batteries have been miniaturized, reduced in weight and increased in capacity, and control sections have been reduced in thickness. As a result, various types of portable data devices have been commercialized. In other words, portable data devices of about a size that can be put in breast pockets and having vertically- or horizontally-oriented liquid crystal display sections, such as mobile telephones, portable electronic games, PDAs (Personal Digital Assistants), digital cameras, video cameras and electronic books have been widely used. In order to provide larger display screens for easier view of display and to make the devices smaller for better portability when carried around, these devices are formed of separate bodies, which are a display-side body including a display section and an apparatus-side body including electronic circuits and the like. The portable data devices formed of the display-side body and device-side body are foldable or bendable.

For example, Japanese Unexamined Patent Publication No. 2002-244764 discloses a structure in which an input device including a keypad and a base unit including a liquid crystal display are connected at a corner using a rotation axis. For carrying around, the input device is rotated so that it overlies the base unit. For use, the input device is rotated to be horizontally oriented. Further, Japanese Unexamined Patent Publication No. 2002-135380 discloses a structure having a first housing foldably connected to a second housing by a hinge. When the first housing is rotated while it is opened or closed, the display orientation is changed, depending on the rotation angle and the position of the device, to make a display easier to view.

In the structure of Japanese Unexamined Patent Publication No. 2002-244764, the base unit and the input device are rotatably connected so that their positions can be changed to a home position and a use position. Further in the device of Japanese Unexamined Patent Publication No. 2002-135380, the display orientation of a display screen is changed depending on the use position.

However, the above two inventions are constructed such that two housings are connected to each other at their ends and are rotated, which makes the housings to have a poor positional relationship between the home position and the use position. Therefore, the portable devices of the above two inventions are difficult to operate and hard to view at use. Since the portable devices can only be in either of the home position or the use position, use of the portable devices in a wide variety of forms cannot be realized.

Furthermore, the device of Japanese Unexamined Patent Publication No. 2002-244764, when used in the horizontal orientation, loses its balance because the centers of the input device and the base unit are displaced from each other, and thereby it has poor operability.

A portable data device of the present invention is adapted to make first and second bodies movable to a position where they are easier to use. For making possible use of the portable data device in a wide variety of forms, the first body including a display section is moved so that the device is in a first or second position. Furthermore, the first body can move to make the device be in a third position.

SUMMARY OF THE INVENTION

A portable data device of the invention comprises: a first body including a display section, the first body having a first long side and a first short side; a second body housing a circuit section for controlling the display section, the second body having a second long side and a second short side; and a connecting member for connecting the first and second bodies, wherein the portable data device has a first position in which the first and second bodies substantially overlie each other and a second position in which the first body is rotated from the first position to overlie the second body such that a part of the second body extends beyond the first body and the second short side coincides with or is located apart from the first long or short side.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1A to FIG. 1C are views of a portable data device in three different positions according to a first embodiment of the invention;

FIG. 2A and FIG. 2B are views of the portable data device in a second position according to the first embodiment of the invention;

FIG. 3A and FIG. 3B are views of the portable data device in a third position according to the first embodiment of the invention;

FIG. 4A and FIG. 4B are views of the portable data device in other positions according to the first embodiment of the invention;

FIG. 5A to FIG. 5C are views of a portable data device in three different positions according to a second embodiment of the invention;

FIG. 6A and FIG. 6B are views of the portable data device in a second position according to the second embodiment of the invention;

FIG. 7A and FIG. 7B are views of the portable data device in a third position according to the second embodiment of the invention;

FIGS. 8A and 8B are views of the portable data device in other positions according to the second embodiment of the invention;

FIG. 9 is a circuit block diagram of the portable data device of the invention;

FIG. 10A to FIG. 10D are views of a connecting member of the portable data device according to the first embodiment;

FIG. 11A and FIG. 11B are cross-sectional views of the connecting member.

DESCRIPTION OF THE PREFERRED EMBODIMENTS

The present invention provides a portable data device comprising: a first body including a display section, the first body having a first long side and a first short side; a second body housing a circuit section for controlling the display section, the second body having a second long side and a second short side; and a connecting member for connecting the first and second bodies, wherein the portable data device has a first position in which the first and second bodies substantially overlie each other and a second position in which the first body is rotated from the first position to overlie the second body such that a part of the second body extends beyond the first body and the second short side coincides with or is located apart from the first long or short side.

Furthermore, the portable data device of the invention may have a third position in which the first body is further rotated from the second position to overlie the second body such that the first long or short side coincides with or is close to the second long or short side.

This allows the device to be usable in the first, second or third position, whereby a wide variety of usage forms can be realized. The first position allows the device to be the smallest in size so that it is easier to carry around. The second and third positions allow the display section to be vertically and horizontally oriented, respectively.

The phrase "substantially overlie" in this invention indicates, when the first and second bodies are almost the same size, a state in which the first and second bodies almost completely overlie each other. The phrase "substantially overlie" indicates, when the first and second bodies are different in size, a state in which the smaller body almost completely overlies the larger body.

The first short side may be located within the second body when the device is in the second position.

The portable data device of the invention, when in the second or third position, preferably has the second body overlying the first body such that the second body has extended portions at opposite sides of the first body. A control section may be provided on the extended portions, so that the control section can be arranged on a greater area and the distance between the keys can be increased. As a result, the portable data device can be used in a wider variety of forms.

The control section may be a controller for moving an object displayed on the display section or a controller for controlling operation of the portable data device.

The portable data device of the invention, when in the first, second or third position, preferably has a centerline of the first body substantially coinciding with a centerline of the second body. With this arrangement, a centerline of a screen can coincide with a centerline of the control section, allowing a user to use the device with better operability and usability.

The portable data device of the invention may include at least one of a camera, speaker and sensor disposed on a position of the second body which is hidden when the device is in the first position and is exposed when the device is in the second or third position. With this arrangement, the camera, speaker and/or sensor can be hidden by the first body when the device is in the first position, that is, when the device is the smallest in size and carried around, so that the camera, speaker and/or sensor can be protected from contamination and impact and prevented from being damaged.

The first position may be a home position and the second position may be a first operating position.

The display section may be vertically oriented when the portable data device is in the second position.

According to the present invention, the connecting member of the portable data device preferably includes a pin and a cam mechanism for allowing the first or second body to rotate and/or slide so that the device is in the first, second or third position. This allows smooth movement from the first to second position or to the third position. Furthermore, two pins may be engaged in a groove that constitutes the cam mechanism. This allows the first and second bodies to be strongly connected and a moving path of the first or second body to be easily changed by changing the cam configuration. Thus, there can be realized a moving path that provides better usability to a user.

Examples of the portable data device of the invention include mobile telephones, portable electronic games, PDAs, digital cameras, video cameras, and electronic books. In addition to those, portable televisions, remote controllers for televisions, videos, air conditioners and the like, and electronic apparatuses for inventory control in stores and the like are included. Furthermore, whiteboards may be included though not portable.

The portable data device of the invention performs different functions in the first, second and third positions, respectively. The respective positions may serve as different use positions of a single type of device. In a portable electronic game machine, for example, there are a home position, a position in which the machine is used as a compatible multiplayer game machine, and a position in which the machine is used as a scrolling-type game machine. In a digital camera, there are a home position, a picture-taking or reproduction position with a vertically-oriented screen, and a picture-taking or reproduction position with a horizontally-oriented screen. A mobile telephone has its display in a standby state when it is in the home position and performs a mail sending or receiving function when it is in a vertically-oriented display position. Furthermore, the mobile telephone is used to perform an Internet browsing function when it is in a horizontally-oriented display position. In an electronic book, there are a home position, a vertical line display position and a horizontal line display position.

The portable data device of the invention can be constructed to function as different types of devices in respective positions. For example, the device may be used as a display screen of a camera when in the first position, an electronic data device when in the second position and an electronic book when in the third position. Instead, the device may be in the home position when in the first position, and may be used as a portable electronic game machine when in the second position and as a digital camera or a wide television when in the third position. Such functions may be appropriately combined.

In the portable data device of the invention, the first body may house the display section such as a liquid crystal display. The display section is not limited to the liquid crystal display and may be any display which can be small in thickness, such as an organic EL (Electroluminescence) display, an LED (Light Emitting Diode) display, a PDP (Plasma Display Panel) or the like. The first body may also house a drive circuit for the liquid crystal display section. The second body may include a control circuit and a battery for the display section. It is preferable that the circuits included in the first and second bodies are separately housed depending on the size and thickness of the first and second bodies. For example, a part of the drive circuit may be housed in the second body, and a part of the control circuit may be housed in the first body. Thus, distinction between the drive and control circuits is not important as long as the circuits are compactly and high-densely housed. The battery may be housed in the first body or in the both bodies. Furthermore, the second body may house a display section for time display or telop display (a single line display). Such arrangement improves the usability of the portable data device.

Since the first and second bodies respectively house circuit components, they are connected by wire communications using coaxial cables or optical fibers. When connected by the wire communications, a LVDS (Low Voltage Differential Signaling) technique in which a several bit signal is transmitted via a single signal line can be used to reduce the number of communication lines. This allows for miniaturization of the portable data device. Alternatively, the first and second bodies can be wirelessly connected using IR (InfraRed) communications in which signals are superimposed on infrared rays, Bluetooth or wireless communications. For this purpose, the first and second bodies include an infrared emitting element and an infrared receiving element or a transmitting antenna and a receiving antenna, respectively. Even when the first and second bodies are connected wirelessly, a power source is preferably connected by a wire.

According to the invention, it is not necessary to distinguish front and rear faces of the first and second bodies, and the display section and control section may be disposed on any face.

At least one of the first or second bodies of the portable data device of the invention preferably has a rectangular shape having an arced portion at opposite sides of the body, and the second body is preferably longer in a longitudinal direction than the first body. The first or second body may have such a shape as oval, rhombus or the like. Further, the first or second body may be of a combination of rectangular, oval and rhombic shapes or of an intermediate shape of these shapes or a combination of such intermediate shapes. The first and second bodies do not have to be bilaterally symmetric, and they may have any desirable shape.

The first and second bodies of the invention may overlie each other such that centerlines respectively in the middle of the first and second bodies in a longitudinal direction completely coincide with each other when the device is in at least one of or all of the first, second and third positions. Preferably, the centerline of the first body completely coincides with the centerline of the second body. However, the centerlines of the two bodies do not necessarily coincide completely with each other. In other words, the centerlines of the first and second bodies may coincide with each other within a range that the gravity center is not biased and the device is easy to carry, view and operate or within a range that the a centerline of the display section, which is disposed in the middle of the first body, is located to be in line with the center of the eyes of an operator for easier view. Further, when the lengths in the vertical and horizontal directions of the first or second body are almost equal, that is, when the first or second body has a shape close to a rectangle, the amount of displacement of the centerlines may be increased.

An exemplary connecting member connecting the first and second bodies of the invention is a mechanism in which a pin and a cam are connected. The cam is formed by forming a groove in the first or second body, and by engaging the pin in the groove, the connecting member is formed. However, the connecting member of the invention is not limited thereto and may be, for example, a rack and pinion structure.

The present invention will hereinafter be described by way of embodiments thereof. However, it should be understood that the present invention be not limited to these embodiments and various modifications can be made within the scope of the invention.

EMBODIMENT 1

FIG. 1A to FIG. 1C are views of a portable data device in three different positions according to a first embodiment of the invention.

The portable data device of the first embodiment includes a rectangular first body 2 having a liquid crystal display section 1 and a rectangular second body 5. The rectangular second body 5 has a direction key 3 on its left side and a set of control keys 4 including, for example, at least one of start, stop, switch buttons and power on/off button on its right side. The first body 2 and the second body 5 are connected in such a manner that they are rotated/slid by means of a connecting member. The structure of the connecting member will be described later.

FIG. 1A shows a position in which the first body 2 and the second body 5 substantially overlie each other. When in this first position, the portable data device is small in size and thereby is suitable for carrying around. In the first position, first short sides 2a, 2b of the first body 2 and second short sides of 5a, 5b of the second body 5 face the same direction, and first long sides 2c, 2d of the first body 2 and second long sides 5c, 5d of the second body 5 face the same direction. Furthermore, in the first position, an image is displayed on the liquid crystal display section 1, and the direction key 3 and the control keys 4 can be used. The keys may be controllers such as knobs, rotation switches, slide switches or the like. The liquid crystal display section 1 can be horizontally oriented, and the control keys 4 can be used to start, stop or switch the display. In the first position, since only the direction key 3 and the control keys 4 can be used, use of the device is limited to those that do not require operation with the keys other than the direction key 3 and the control keys 4.

The first body 2 is rotatable/slidable with respect to the second body 5. FIG. 1B shows the portable data device in the second position. In the second position, the first short side 2a of the first body 2 coincides with the second long side 5d of the second body 5 so that the display section 1 is vertically oriented. In this position, a centerline in the major axis direction of the first body 2 coincides with a centerline in the minor axis direction of the second body 5. The first body 2 and second body 5 thus overlying each other makes the portable data device well balanced and easy to carry, thereby allowing operation of the device to be easier. Since the display section is located to be in line with the center of the user's eyes, the display section is easier to view. Further, the second body 5 has side portions (extended portions) exposed at opposite sides of the first body 2, allowing the control section to have a greater area. Consequently, a greater number of keys can be arranged on the side portions of the second body 5 or the keys can be arranged at greater intervals for easier operation. Furthermore, keys 6, 7, which are disposed on the second body 5 and hidden when the device is in the first position, are exposed so that they can be used. The keys are controllers such as knobs, rotation switches, slide switches or the like. The second body 5 has speakers 9, 10 disposed on a lower side of the side portions. The speakers 9, 10 are fully exposed and output sound when the device is in the second position.

When the liquid crystal display section 1 is vertically oriented, the display orientation is changed to vertical by a sensor (not shown) that detects the orientation of the liquid crystal display section 1 and a circuit that controls the display orientation. FIG. 2A shows the portable data device when the liquid crystal display section 1 displays a scrolling-type game screen. The second body 5 has the four-way direction key 3 on its left side and the set of control key 4 including, for example, at least one of start, stop and switch buttons on its right side. The second body 5 further includes the key 6 and the key 7 for switching the type of games on the right side and on the left side, respectively.

An opposite face of the portable data device includes a camera 11 and a visible-light source 12 such as an LED on a portion of the first body 2 extending beyond the second body 5 as shown in FIG. 2B. Using the visible-light source 12 as a flash lamp, a picture can be taken with the camera 11. This extended portion of the first body is hidden when the device is in the first position but is exposed when the device is in the second position. The second body 5 includes an LED infrared source 13 near the second long side 5c. Furthermore, a photodetector is disposed in line with the infrared source 13. By including the infrared source 13 and the photodetector, the device can be used as a compatible multiplayer-type game machine or a bidirectional remote controller. It is preferable that microscopic irregularities 14a, 14b are formed on both sides of the second body 5 in order to prevent slipping when the device is carried around.

By disposing the camera on a lower right side of the second body 5 as seen from the front face of the first body 2 in FIG. 1A, a picture can be taken when the device is in either one of the vertical orientation (first position) and horizontal orientation (second position).

If a camera is disposed in place of one of the keys 6, 7, an operator can take a picture of oneself. This further extends the application range of the device.

As shown in FIG. 1C, the portable data device can be in a third position in which the liquid crystal display section 1 can be horizontally oriented by rotating/sliding the first body 2 such that the first long side 2c of the first body 2 is located upwardly distant from the second long side 5d of the second body 5. In the third position, a centerline in the minor axis direction of the first body 2 coincides with a centerline in the minor axis direction of the second body 5. By overlying the first body 2 on the second body 5 in such a manner as described above, the liquid crystal display section 1 of the first body 2 can be moved to an upper position of the second body 5 where the liquid crystal display section 1 is easier to view. In this position, a key 8 is disposed on a lower portion of the second body 5 uncovered with the first body 2. The key 8 can be used as an auxiliary operation key. Since the centerlines of the first body 2 and the second body 5 coincide with each other, the portable data device is well balanced, and thus it is easy to carry and operate. Furthermore, side portions of the second body 5 are uncovered at opposite sides of the first body 2 by the same area. The control section can be divided and the divided portions can be suitably arranged on the side portions.

When the liquid crystal display section 1 is horizontally oriented, the display orientation is changed to horizontal by the sensor for detecting the display orientation of the liquid crystal display section 1 and the display control circuit for controlling the display orientation. FIG. 3A shows an example in which the liquid crystal display section 1 displays a compatible multiplayer-type game on a screen. The second body 5 has the four-way direction key 3 on its left side and the set of control keys 4 including, for example, at least one of start, stop and switch buttons on its right side.

In addition to the key 8, a speaker or keypad is arranged on a portion of the second body 5 uncovered with the first body 2. Alternatively, a slot for inserting a game cassette (ROM memory) may be formed, or a sub-display screen for displaying a single line sentence such as a telop display, time display or the like may be disposed. Furthermore, a fingerprint sensor for authenticating a user of the portable data device may be disposed. The second body 5 in this position is under use. However, in the first position, the first body 2 overlies on the second body 5 and is hidden by the first body 2. This protects the speaker, keypad, sensor and the like from being damaged or contaminated.

When seen from an opposite face as shown in FIG. 3B, the portable data device in this position has a camera 15 and a visible-light source 16 such as an LED on a portion of the first body 2 extending beyond the second body 5. Using the visible-light source 17 as a flash lamp, a picture can be taken with the camera 15. This extended portion is hidden when the device is in the first position but is exposed when the device is in the second position. The second body 5 includes an LED infrared source 17 near the second long side 5c.

Where the vertically-oriented first body 2 as shown in FIG. 1B is turned upside down and seen from the opposite face, the device looks as shown in FIG. 4A. Instead of forming the irregularities, a liquid crystal display section 25 is provided. Furthermore, a control key 26 is provided on a lower portion of the first body 2 uncovered with the second body 5. This allows the portable data device to further be used for different applications.

Where the horizontally-oriented first body 2 as shown in FIG. 1C is turned upside down and seen from the opposite face, the device looks as shown in FIG. 4B. Instead of forming the irregularities, the liquid crystal display section 25 is provided. Furthermore, the control key 26 is provided on a lower portion of the first body 2 uncovered with the second body 5. This allows the portable data device to further be used for different applications.

SECOND EMBODIMENT

A portable data device according to a second embodiment of the invention is similar to the device of the first embodiment. However, in this embodiment, the shape of the cam of the connecting member for connecting and rotating/sliding the first and second bodies is changed in order to change the positional relationship between the first body 2 and the second body 5. The structure of the connecting member will be described later.

FIG. 5A to FIG. 5C are views of the portable data device in three different positions according to the second embodiment. Referring to FIG. 5A to FIG. 8B, the device of the second embodiment will be described hereinbelow.

As shown in FIG. 5A, the first body 2 and the second body 5 substantially overlie each other so that the portable data device is in the first position, that is, the home position. In this position, the first short sides 2a, 2b of the first body 2 and second short sides of 5a, 5b of the second body 5 face the same direction, and first long sides 2c, 2d of the first body 2 and second long sides 5c, 5d of the second body 5 face the same direction.

When the first body 2 is rotated/slid, the portable data device is moved to the second position as shown in FIG. 5B. In this position, the first short side 2a of the first body 2 is at an upward-lifted position which is located away from the second long side 5d of the second body 5. In this position, the centerline in the major axis direction of the first body 2 coincides with the centerline in the minor axis direction of the second body 5. The first body 2 and the second body 5 thus overlying each other makes the portable data device well balanced and easy to carry, thereby allowing operation of the device to be easier. In the second position, the first body 2 and the second body 5 overlie each other by less amount, and the second body 5 has a larger exposed area. Where the control section is disposed on this exposed portion, a greater number of keys can be provided, or the distance between the keys can be increased for easier operation.

In the second embodiment as well, when the liquid crystal display section 1 is vertically-oriented, the display orientation is changed to horizontal by the sensor for detecting the display orientation of the liquid crystal display section 1 and the display control circuit for controlling the display orientation. FIG. 5B shows an example in which the liquid crystal display section 1 displays a vertically-oriented electronic book on the screen. The second body 5 has the four-way direction key 3 for scrolling the display screen in four directions on its left side and the set of control keys 4 including, for example, at least one of start, stop, switch buttons and power on/off button on its right side. A lower portion of the second body 5 is uncovered with the first body 2, and a slot 21 for inserting a memory medium of an electronic book is formed on the lower portion. When the portable data device is used for applications other than electronic books, a speaker, keypad, slot for inserting a game cassette (ROM memory), sub display screen, fingerprint sensor or the like may be disposed.

An opposite face of the portable data device in this position looks as shown in FIG. 6B. The first body 2 has the camera 11 and the visible-light source 12 such as an LED disposed on a portion extending beyond the second body 5. The second body 5 includes the LED infrared source 13 near the second long side 5c. It is preferable that microscopic irregularities 14a, 14b are formed on both sides of the second body 5 in order to prevent slipping when the device is carried around.

As shown in FIG. 5C, the first long side 2c of the first body 2 is at an upward-lifted position which is located away from the second long side 5d of the second body 5. In this position, a centerline in the minor axis direction of the first body 2 coincides with a centerline in the minor axis direction of the second body 5. By overlying the first body 2 on the second body 5 in such a manner as described above, the liquid crystal display section 1 of the first body 2 can be moved to an upper position of the second body 5 where the liquid crystal display section 1 is easier to view. Since the centerlines of the first body 2 and the second body 5 coincide with each other, the portable data device is well balanced, and thus it is easy to carry and operate. Furthermore, side portions of the second body 5 are exposed at opposite sides of the first body 2 by the same area. The control section can be divided and the divided portions can be suitably arranged on the side portions.

When the liquid crystal display section 1 is horizontally oriented, the display orientation is changed to horizontal by the sensor for detecting the display orientation of the liquid crystal display section 1 and the display control circuit for controlling the display orientation. FIG. 7A shows an example in which the liquid crystal display section 1 is horizontally oriented. The second body 5 has the four-way direction key 3 on its left side and the set of control keys 4 including, for example, at least one of start, stop and switch buttons on its right side. On a portion of the second body 5 uncovered with the first body 2, a speaker, keypad, slot for inserting a game cassette (ROM memory), sub-display screen or fingerprint sensor is disposed. When the keypad is disposed on this portion, input of text is easier.

When seen from the opposite face as shown in FIG. 7B, the portable data device in this position has the camera 15 and the visible-light source 16 such as an LED on a portion of the first body 2 extending beyond the second body 5. Furthermore, the second body 5 includes an LED infrared source 18 near the second long side 5c.

Where the vertically-oriented first body 2 as shown in FIG. 5B is turned upside down and seen from the opposite face, the device looks as shown in FIG. 8A. Instead of forming the irregularities 14a, 14b, a liquid crystal display section 28 is provided. Furthermore, a control key 29 is provided on a lower portion of the first body 2 uncovered with the second body 5. With this construction, the portable data device can further be used for different applications.

Where the horizontally-oriented first body 2 as shown in FIG. 5C is turned upside down and seen from the opposite face, the device looks as shown in FIG. 8B. Instead of forming the irregularities 14a, 14b, the liquid crystal display section 28 is provided. Furthermore, a control key 30 is provided on a lower portion of the first body 2 uncovered with the second body 5. With this construction, the portable data device can further be used for different applications.

Circuit of the Portable Data Device

FIG. 9 is a circuit block diagram of the portable data device of the present invention.

In FIG. 9, reference number 31 denotes a movement key input section for moving an object displayed on the display screen. The input section 31 corresponds to the direction key 3 provided on the second body 5. Reference number 32 denotes a mode switch/start key input section. The input section 32 corresponds to the set of control keys 4 provided on the second body 5. 33, 34 denote digital cameras which correspond to the cameras 11, 15 provided on the opposite faces of the first body 2, respectively. 35 denotes a camera interface for transmitting digital signals output from the cameras 33, 34 to a control section 46. 36 is an interface which corresponds to an input section such as the fingerprint sensor, keypad or the like. 37 denotes a program cassette interface for digitally communicating with, for example, a program cassette for an electronic game machine.

Reference number 38 denotes a speaker which corresponds to the speaker provided on the second body 5. In the present invention, the speaker not only has a function of outputting sound, but also has a function of inputting sound as a microphone. 39 denotes a sound input/output section for inputting/outputting sound signals to/from the speaker 38. 40 is a display drive circuit for driving the liquid crystal display device 1 disposed on the first body 2. 41 denotes a display panel angle detection switch for detecting the rotated position of the first body 2. 42 is a display angle control section for controlling the orientation of an image displayed by the display drive circuit 40 to be vertical or horizontal based on a signal detected by the display panel angle detection switch 41. In the first and second embodiments, the display is horizontally oriented in the first position, vertically oriented in the second position and horizontally oriented in the third position using the angle detection switch 41 and the display angle control section 42. 43 denotes a drive circuit for a sub-display section provided on the first body 2 or the second body 5. 44 is an infrared sensor, and 45 is an infrared source.

Each of the aforementioned components is connected to and driven by the control section 46. The control section 46 includes therein a memory 47 having a RAM 48 and a ROM 49. The memory 47 adds programs for the portable data device internally or externally to the RAM 48 and ROM 49, stores data, and controls and drives the portable data device.

The circuit of the portable data device of the invention is constructed as above and each of the circuit components is housed in either of the first body 2 and the second body 5. The circuit components are arbitrarily separated and housed in the first body 2 or the second body 5 in accordance with the size or thickness of the first body 2 and the second body 5. Circuits that may have interactions with each other may be separately housed or interrelated circuits may be arranged close to each other. A part of the drive circuit may be housed in the second body 5, and a part of the control circuit may be housed in the first body 2. The circuits housed in the first body 2 and the second body 5 are connected by wire communications using telecommunication lines, optical fibers or the like. When connected by telecommunications, a serial/parallel signal conversion technique using a several bits signal as a single signal line is employed. As such a technique, a LVDS technique in which parallel signals are transmitted after being converted into low voltage differential serial signals is used. By employing such a technique, the number of lines connecting the first body 2 and the second body 5 can be reduced, whereby the device can be miniaturized and have a shape with better portability. Instead, the circuits may be connected by IR communications in which signals are superimposed on infrared rays, or may be connected by radio communications by providing a wireless antenna in the first body 2 and the second body 5. A battery is housed in the second body 5 and power is supplied to the first body 2 via the connecting lines.

Connecting Member of the Portable Data Device

The portable data device of the invention has the first body 2 connected to the second body 5 as shown in FIG. 10A to FIG. 10D.

The first body 2 has a pin male portion provided on its face opposed to the second body 5, and the second body 5 has a groove female portion formed in its face opposed to the first body 2. The pin and the groove may be provided on/in either one of the first body and second body 5. In this embodiment, an explanation will be given on an example in which two pins 51, 52 are provided on the first body 2 and two grooves 53, 54 are formed in the second body 5. The second body 5 does not necessarily have two separate grooves and may have a single continued groove. The pin 51 is disposed almost on the center of a case wall 55 of the first body 2. The pin 52 is disposed rightward from the pin 51 on the first body 2. The pins 51, 52 are constructed to be strongly fixed to the case wall 55 of the first body 2 and not to easily slip out. The pins 51, 52 are shaped to have flat boards 57, 58 at their ends, respectively. The pins 51, 52 are fixed to the case wall 55 of the first body 2 by screws, welding, soldering, glueing or the like. The grooves 53, 54 are formed by cutting an opening 59a in a case wall 59 of the second body 5 as shown in FIG. 11A. In view of water resistance and dust resistance, it is preferable that a groove 60 having a bottom is formed as shown in FIG. 11B. The boards 57, 58 at the ends of the pins 51, 52 are fitted inside the grooves 53, 54, respectively, to prevent slipping out.

The groove 53, as shown in FIG. 10A to FIG. 10D, is formed almost linearly in the case wall 59 of the second body 5. When the first body 2 and the second body 5 are in the home position, they are connected to each other such that the pin 51 is engaged in the groove 53 at its lowermost position. A general shape of the groove 54 is a U-shape or a pan-like shape. When the first body 2 and the second body 5 are in the home position, they are connected to each other such that the pin 52 is engaged in the groove 54 at an uppermost position of an almost linear portion 54a of the groove 54b. The almost linear portion 54a is located at the right side of the groove 54. The portion 54a is almost linearly formed and has its lower portion slightly tilted to the right. Following the portion 54a, the groove 54 has a linear portion 54b and further has an arced portion 54c. The arced portion has an upper end of the groove 53 as its center. The shapes of the portions 54a, 54b and 54c described above are schematic, and connections between the 54a and 54b and between 54b and 54c are circularly formed for smooth movement of the pin 52. Though the grooves 53 and 54 are separately formed, a lower end of the groove 53 may be extended until it reaches the groove 54, for example, so that the grooves 53 and 54 are continued.

The first body 2 and the second body 5 in the home position are shown in FIG. 10A. In this position, the pin 51 is located at the lowermost position of the groove 53 and the pin 52 is located at the uppermost position of the portion 54a.

Then, when the first body 2 is clockwisely rotated, the pin 51 is not moved and the pin 52 is moved to the lower end of the portion 54a as shown in FIG. 10B. At this time, the first body 2 is in a tilted position. When the first body 2 is further rotated clockwisely, the pin 52 is moved leftward in the portion 54b while the pin 51 is moved upward in the groove 53 because the portion 54b is almost linearly formed. This allows the first body 2 to rotate and slide simultaneously and be in the position shown in FIG. 10C. This is the position explained in the first and second embodiments.

When the first body 2 is further rotated, the first body 2 is rotated about the upper end of the groove 53 as its center because the portion 54c is formed of an arc whose center is located at the uppermost end of the groove 53 and the pin 51 is located at the upper end of the groove 53. With this movement, the first body 2 is now in the position shown in FIG. 10D. This is the position explained in the first and second embodiments. In order to make the device stably positioned in the respective first, second and third positions, it may be effective to slightly change the shape of the groove 54. For example, it is preferable that an upper end of the portion 54a, the connection between the portions 54b and 54c and a left end of the portion 54c swell slightly and a spring is provided so that the first body 2 is drawn closer to the pin 51.

When the first body 2 is counterclockwisely rotated, it is sequentially moved in the order of FIG. 10D to FIG. 10A.

The connecting member of the portable data device according to the first embodiment is described hereinabove. It should be understood that the connecting member of the device according to the second embodiment can also be moved as shown in FIG. 5A to FIG. 5C as explained in the second embodiment by changing the shape of the groove 54. It is preferable that the shape of the connection between the portions 54b and 54c is changed.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable data device comprising:
a first body including a display section, the first body having a first long side and a first short side;
a second body housing a circuit section for controlling the display section, the second body having a second long side and a second short side; and
a connecting member comprising a male portion formed on one of the first body and the second body and a female portion, for engaging the male portion, formed on the other of the first body and the second body, the connecting member connecting the first and second bodies so that the first body is rotatably movable from a first position in which the first and second bodies substantially overlie each other and the first and second long sides coincide to a second position in which a part of the first body extends beyond the second body and the first short side coincides with the second long side.

2. The portable data device of claim 1, wherein the fist short side is located within the second body when the device is in the second position.

3. The portable data device of claim 1, wherein the first body overlies the second body such that the second body has extended portions at opposite sides of the first body.

4. The portable data device of claim 3, wherein the extended portions include a control section for the portable data device disposed thereon.

5. The portable data device of claim 4, wherein the control section comprises a controller for moving an object displayed on the display section or a controller for controlling operation of the portable data device.

6. The portable data device of claim 3, wherein the extended portions comprise an accessory disposed thereon.

7. The portable data device of claim 6, wherein the accessory comprises at least one of a camera, sensor, speaker and control key.

8. The portable data device of claim 1, wherein the first body has a centerline substantially coinciding with a centerline of the second body when the device is in the first or second position.

9. The portable data device of claim 1, wherein at least one of the first and second bodies has a rectangular shape having an arced portion at opposite sides of the body, and the second body is longer in a longitudinal direction than the first body.

10. The portable data device of claim 1, wherein the first position is a home position and the second position is a first operating position.

11. The portable data device of claim 1, wherein the display section is vertically oriented when the device is in the second position.

12. The portable data device of claim 1, wherein the device has a third position in which the first body is further rotated from the second position to overlie the second body such that the first long or short side coincides with or is close to the second long or short side.

13. The portable data device of claim 12, wherein the first body overlies the second body such that the second body has extended portions at opposite sides of the first body.

14. The portable data device of claim 13, wherein the extended portions comprise a control section for the portable data device disposed thereon.

15. The portable data device of claim 14, wherein the control section comprises a controller for moving an object displayed on the display section or a controller for controlling operation of the portable data device.

16. The portable data device of claim 13, wherein the extended portions comprise an accessory disposed thereon.

17. The portable data device of claim 16, wherein the accessory comprises at least one of a camera, sensor, speaker and control key.

18. The portable data device of claim 12, wherein the first body has a centerline substantially coinciding with a centerline of the second body when the device is in the first or third position.

19. The portable data device of claim 12, wherein the first position is a home position and the third position is a first operating position.

20. The portable data device of claim 12, wherein the display section is horizontally oriented when the device is in the third position.

21. The portable data device of claim 1, in which the connecting member connects the first and second bodies so that the first body is also movable from the first position to a third position which in which the first and second long sides are parallel, but do not coincide.

22. The portable data device of claim 1, in which the first and second short side dimensions are the same.

23. A portable data device comprising:
a first body including a display section, the first body having a first long side and a first short side;
a second body housing a circuit section for controlling the display section, the second body having a second long side and a second short side; and
a connecting member for connecting the first and second bodies,
wherein the connecting member includes a pin and a cam mechanism for allowing the first or second body to move so that the device is selectively positionable in a first position in which the first and second bodies substantially overlie each other and the first and second long sides coincide, a second position in which a part of the first body extends beyond the second body and the first short side coincides with the second long side, and a third position in which the first and second long sides are parallel, but do not coincide.

24. The portable data device of claim 23, wherein the connecting member includes two pins and the pins are engaged in a groove that constitutes the cam mechanism.

25. The portable data device of claim 23, wherein the first and second short side dimensions are the same.

26. A portable data device, comprising:
a first body including a display section, the first body having a long side and a short side;
a second body housing a circuit section for controlling the display section, the second body having a long side and a short side; and
a connecting member for connecting the first and second bodies so as to permit relative movement therebetween,
wherein the connecting member comprises first and second pins and first and second grooves arranged on the first and second bodies,
wherein the first groove receives the first pin and the second groove receives the second pin,
wherein the second groove has a generally U-shaped configuration with a substantially liner bottom portion, a substantially liner first side portion and an arcuate second side portion and the first groove is substantially linear and substantially parallel to the short side of the first body, and wherein one end of the first groove substantially corresponds to a center associated with the arcuate second side portion of the second groove.

27. The portable data device of claim 26, wherein the first groove and the second groove connect to each other.

28. The portable data device of claim 26, wherein the first groove and the second groove do not connect to each other.

* * * * *